United States Patent
Ishihara et al.

[11] Patent Number: 6,119,316
[45] Date of Patent: *Sep. 19, 2000

[54] FASTENER

[75] Inventors: Yuuichirou Ishihara; Takeshi Mizuno, both of Okazaki; Masaaki Yamakami, Toyota, all of Japan

[73] Assignees: Daiwa Kasei Kogyo Kabushiki Kaisha; Kojima Press Kogyo Kabushiki Kaisha, both of Aichi-ken, Japan

[ * ] Notice: This patent is subject to a terminal disclaimer.

[21] Appl. No.: 09/377,243

[22] Filed: Aug. 19, 1999

Related U.S. Application Data

[63] Continuation of application No. 08/867,971, Jun. 3, 1997, Pat. No. 5,966,782.

[30] Foreign Application Priority Data

Jun. 3, 1996 [JP] Japan ................................ 8-140030
Mar. 19, 1997 [JP] Japan ................................ 9-066612

[51] Int. Cl.[7] ............................ A44B 17/00; F16B 21/00
[52] U.S. Cl. .............................. 24/297; 24/289; 24/295; 411/509
[58] Field of Search ....................... 24/297, 289, 295, 24/293, 292; 411/508, 509, 510; 52/718.1

[56] References Cited

U.S. PATENT DOCUMENTS

| | | | |
|---|---|---|---|
| 3,197,935 | 8/1965 | Clancy et al. | 24/295 |
| 3,208,119 | 9/1965 | Seckerson | 24/295 |
| 3,213,506 | 10/1965 | Fernberg | 24/295 |
| 3,869,958 | 3/1975 | Murayama | 24/289 |
| 4,402,118 | 9/1983 | Benedetti | 24/289 |
| 4,422,222 | 12/1983 | Notoya | 24/289 |
| 4,644,612 | 2/1987 | Osterland | 24/295 |
| 4,778,320 | 10/1988 | Nakama | 411/509 |
| 5,291,639 | 3/1994 | Baum et al. | 24/297 |
| 5,533,237 | 7/1996 | Higgins | 24/289 |

*Primary Examiner*—Victor N. Sakran
*Attorney, Agent, or Firm*—Dennison, Scheiner, Schultz & Wakeman

[57] ABSTRACT

A fastener used for mounting a mounting object having an insertion rib onto a support body having a mounting aperture. The fastener is previously fitted to the insertion rib of the mounting object and then inserted into the mounting aperture of the support body by pressing the insertion rib thereinto, thereby removably mounting the mounting object on the support body. The fastener includes a fastener body having a shoulder portion. The shoulder portion is adapted to elastically engage an inner edge of the mounting aperture of the support body when the fastener is inserted into the mounting aperture with the insertion rib. The fastener further includes a gripper portion provided on the fastener body and having at least one gripper surface and at least one engagement projection formed thereon. The gripper surface is adapted to contact the insertion rib of the mounting object when the fastener is fitted to the insertion rib. The engagement projection is adapted to engage a slot formed in the insertion rib of the mounting object when the fastener is fitted to the insertion rib.

26 Claims, 8 Drawing Sheets

FASTENER

This is a continuation application of U.S. application Ser. No. 08/867,971, filed Jun. 3, 1997; U.S. Pat. No. 5,966,782.

BACKGROUND OF THE INVENTION58

1. Field of the Invention

The present invention relates to a clip or fastener used for removably mounting an instrument cluster, a center cluster or other members (which will be referred to as a "cluster" hereinafter) to an instrument panel of an automobile.

2. Description of the Prior Art

Conventionally, a fastener of this type is made of a spring metal plate. As shown in FIG. 15, the conventional fastener 200 is constituted of a substantially V-shaped fastener body 201 and a pair of opposed gripper tongues 202 inwardly stamped out from the fastener body 201. The fastener body 201 has opposed shoulder portions 206 each of which is designed to engage an inner edge of a mounting aperture 242 formed in an instrument panel 240 on which a cluster 230 having an insertion rib 232 is to be mounted. Further, one of the gripper tongues 202 is formed with an engagement lip 204 which may engage a thin slot 234 formed in the insertion rib 232 of the cluster 230 when the fastener 200 is fitted to the insertion rib 232 by engaging the gripper tongues 202 with the insertion rib 232.

The fastener 200 is previously fitted to the insertion rib 232 of the cluster 230 by engaging the gripper tongues 202 with the insertion rib 232. The insertion rib 232 of the cluster 230 with the fastener 200 is pressed into the mounting aperture 242 of the instrument panel 240 until seating surfaces 237 of the cluster 230 contact an outer surface of the instrument panel 240. At this time, as shown in FIG. 15, the fastener 200 is inserted into the mounting aperture 242 with the insertion rib 232 of the cluster 230, so that the shoulder portions 206 of the fastener body 201 securely engages the inner edge of the mounting aperture 242. As a result, the insertion rib 232 is fixed in the mounting aperture 242 of the instrument panel 240. Thus, the cluster 230 is mounted on the instrument panel 240.

However, the conventional fastener 200, when fitted to the insertion rib 232 of the cluster 230, may easily incline or loosen since the gripper tongues 202 of the fastener 200 cannot be sufficiently stabilized on the insertion rib 232. This is because each gripper tongue 202 is of the point-contact type, which provides a very small area of contact with the insertion rib 232. As a result, troublesome work is required to mount the cluster 230 onto the instrument panel 240. Further, in a worse case, the fastener 200 fitted to the insertion rib 232 may accidentally fall off from the insertion rib 232 during handling of the cluster 230 before the cluster 230 is mounted on the instrument panel 240.

SUMMARY OF THE INVENTION

It is an object of the present invention to provide a fastener which may be sufficiently stabilized on an insertion rib of a cluster or mounting object when it is fitted thereto, thereby facilitating work to mount the mounting object onto an instrument panel or support body and preventing accidental falling off of the fastener from the insertion rib.

It is another object of the present invention to provide a fastener which may steadily mount a mounting object on a support body without producing looseness therebetween if there is a variation in thickness of the instrument panel.

The present invention provides a fastener used for mounting a mounting object having an insertion rib onto a support body having a mounting aperture. The fastener is previously fitted to the insertion rib of the mounting object and then inserted into the mounting aperture of the support body by pressing the insertion rib thereinto, thereby removably mounting the mounting object on the support body. The fastener includes a fastener body having a shoulder portion. The shoulder portion is adapted to elastically engage an inner edge of the mounting aperture of the support body when the fastener is inserted into the mounting aperture with the insertion rib. The fastener further includes a gripper portion provided on the fastener body and having at least one gripper surface and at least one engagement projection formed thereon. The gripper surface is adapted to contact the insertion rib of the mounting object when the fastener is fitted to the insertion rib. The engagement projection is adapted to engage a slot formed in the insertion rib of the mounting object when the fastener is fitted to the insertion rib.

With the fastener of the present invention, the gripper surface of the gripper portion contacts the insertion rib of the mounting object when the fastener is fitted to the insertion rib of the mounting object. Further, the engagement projection engages the slot formed in the rib of the mounting object when the fastener is fitted to the insertion rib of the mounting object. Thus, the fastener is sufficiently stabilized on the insertion rib of the mounting object when it is fitted thereto. Therefore, the mounting object can be easily mounted on the support body. Additionally, the fastener can be effectively prevented from accidental falling off from the insertion rib of the mounting object.

The fastener may have a stabilizer provided on the fastener body. The stabilizer is adapted to elastically engage an outer surface of the support body when the fastener is inserted into the mounting aperture of the support body.

With the fastener thus constructed, when the fastener is inserted into the mounting aperture of the support body, the shoulder portion elastically engages the inner edge of the mounting aperture of the support body, and simultaneously, the stabilizer elastically engages the outer surface of the support body. Thus, the mounting object can be steadily mounted on the support body without producing looseness therebetween if there is a variation in thickness of the support body. Therefore, the mounting object can be effectively prevented from shaking on the support body if the support body vibrates. This may lead to elimination of noise due to vibration of the support body.

Further, the fastener body may be designed so that the shoulder portion engages the inner edge of the mounting aperture of the support body when the insertion rib of the mounting object is pressed into the mounting aperture of the support body until a seating surface formed on the mounting object contacts an outer surface of the support body.

With the fastener thus constructed, the mounting object can be steadily mounted on the support body without producing looseness therebetween.

The present invention will become more fully apparent from the claims and the description as it proceeds in connection with the drawings.

DETAILED DESCRIPTION OF THE PREFERRED EMBODIMENT

Preferred embodiments of the present invention will be described in detail with reference to the drawings. It should be noted, however, that the present invention is not limited to the following embodiments.

A first embodiment of the present invention will now be described with reference to FIGS. 1 to 5(B).

Figure 1:
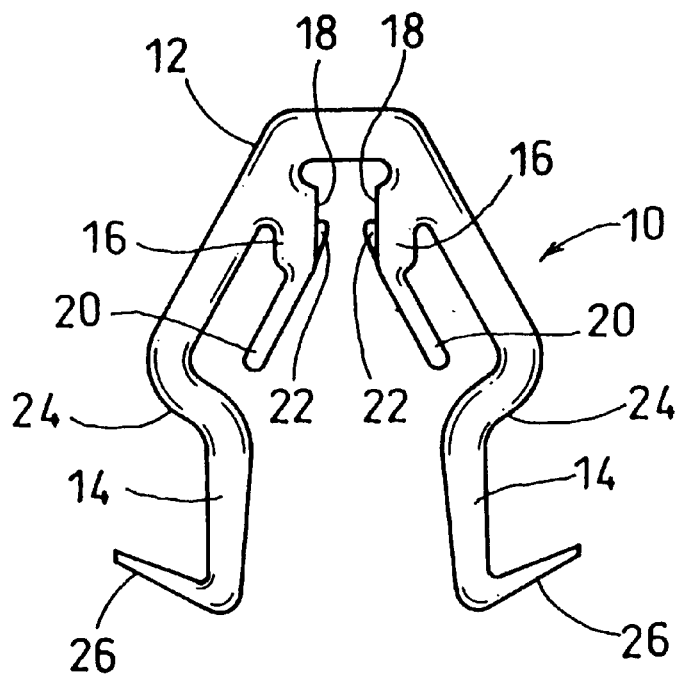
FIG. 1 is an elevational view of a fastener according to a first embodiment of the present invention.
Figure 2:
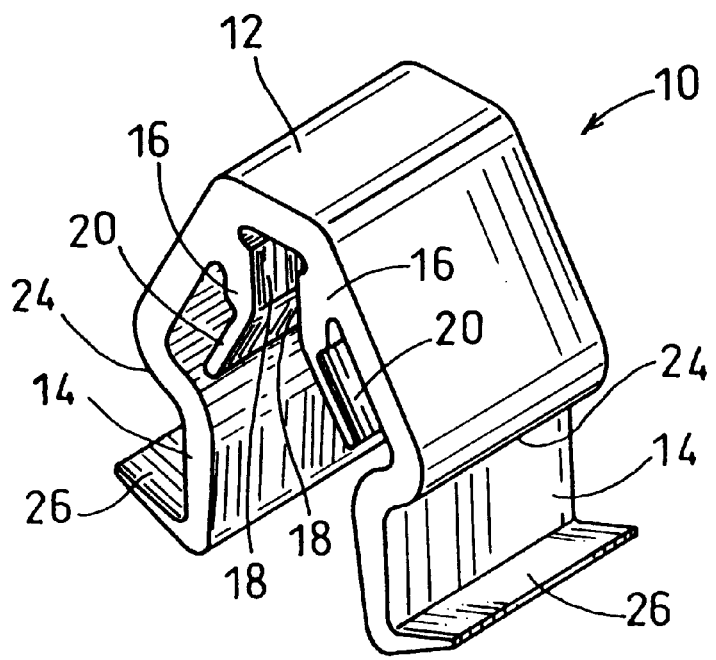
FIG. 2 is a perspective view of the fastener.
Figure 3:
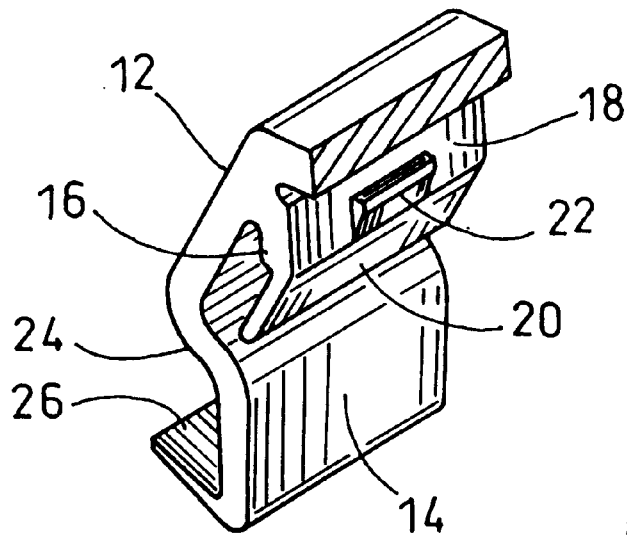
FIG. 3 is a perspective view of the fastener cut in half.

As shown in FIGS. 1 to 3, a fastener 10 is integrally formed by injection molding a resin. The fastener 10 is mainly constituted of a substantially inverted V-shaped fastener body 12 having end portions, a pair of opposed legs 14 provided on the end portions of the fastener body 12, and a pair of opposed gripper tongues 16 as a gripper portion provided on an inner surface of the fastener body 12.

The gripper tongues 16 include a pair of flattened gripper surfaces 18 disposed in substantially parallel opposed relation and are dimensioned such that the distance between the gripper surfaces 18 is slightly smaller than the thickness of an insertion rib of a cluster (which will be hereinafter described). The gripper tongues 16 are provided with a pair of outwardly extending guide lips 20. As will be appreciated, the guide lips 20 may act as a guide member to reliably introduce the insertion rib of the cluster into a space between the gripper surfaces 18. Moreover, each gripper surface 18 is provided with an engagement projection 22. The engagement projection 22 is arranged in the middle of the gripper surface 18 and includes an inclined leading surface so that the insertion rib of the cluster is easily introduced into the space between the gripper surfaces 18. It is to be noted that gripper tongues 16 can be spread to broaden the space between the gripper surfaces 18 since the gripper tongues 16 are deformable because of its elasticity.

The fastener body 12 has a pair of opposed outer shoulder portions 24 which extend along juncture portions of the fastener body 12 and the legs 14. Further, each leg 14 is provided with a stabilizer lip 26 which from the free end thereof. As will be easily understood, the outer shoulder portions 24 and the legs 14 can be displaced outwardly and inwardly (laterally as viewed in FIG. 1) since the fastener body 12 can be elastically deformed. Additionally, the stabilizer lip 26 can be deformed upwardly and downwardly (vertically as viewed in FIG. 1) because of its elasticity.

Figure 5A:
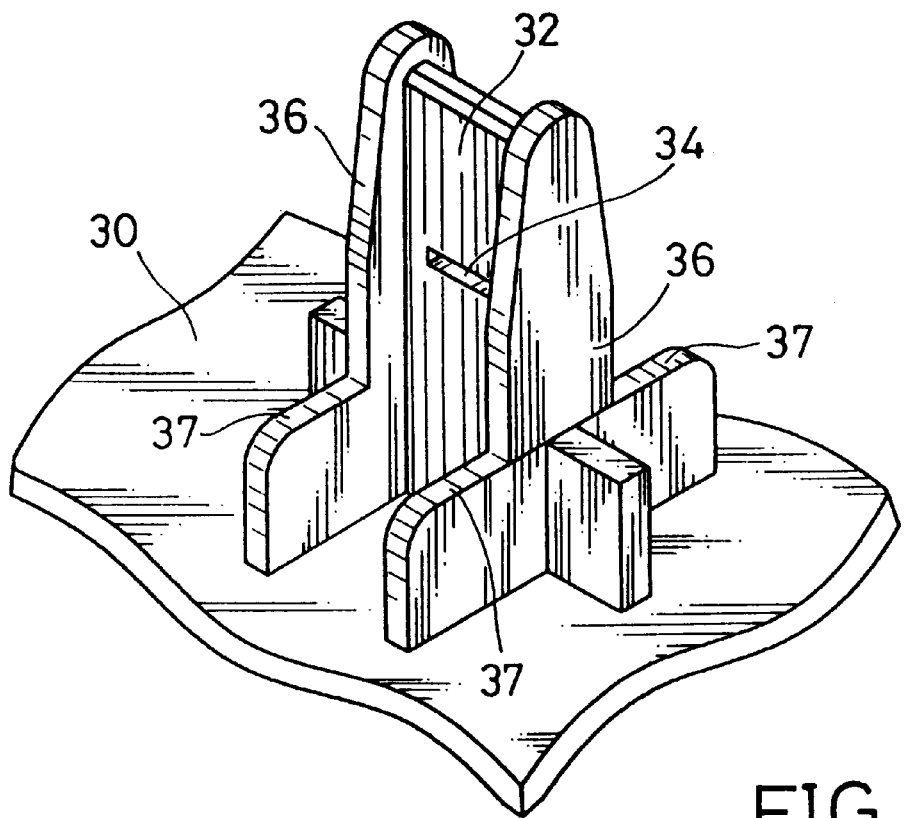
FIG. 5(A) is a fragmentary perspective view of a cluster showing an insertion rib thereof.
Figure 5B:
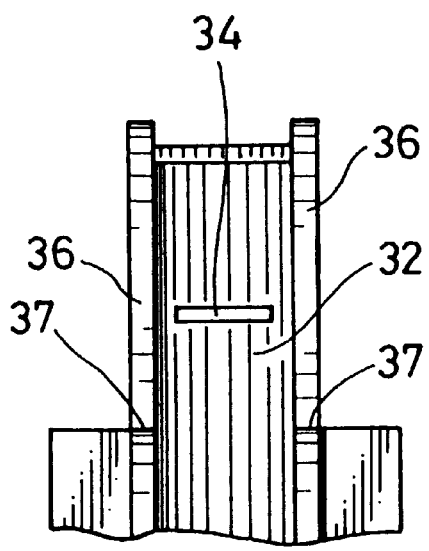
FIG. 5(B) is an elevational view of the insertion rib.

Referring to FIGS. 5(A) and 5(B), partly shown therein is a cluster 30 as a mounting object which is to be mounted on an instrument panel (which will be hereinafter described) by the fastener 10. The cluster 30 is integrally formed with a plurality of the insertion ribs 32 (one of which is shown for illustration purposes) to which the fastener 10 will be attached. The cluster 30 is also provided with a pair of plate-like projections 36 between which the insertion rib 32 is retained. The insertion rib 32 has a transversely elongated thin slot 34 which is dimensioned to be engageable with the engagement projections 22 of the gripper tongues 16 of the fastener 10. Additionally, each projection 36 includes a pair of shouldered seating surfaces 37.

The operation of the fastener 10 thus constructed will now be described in connection with the process for mounting the cluster onto the instrument panel as a support body.

Figure 4:
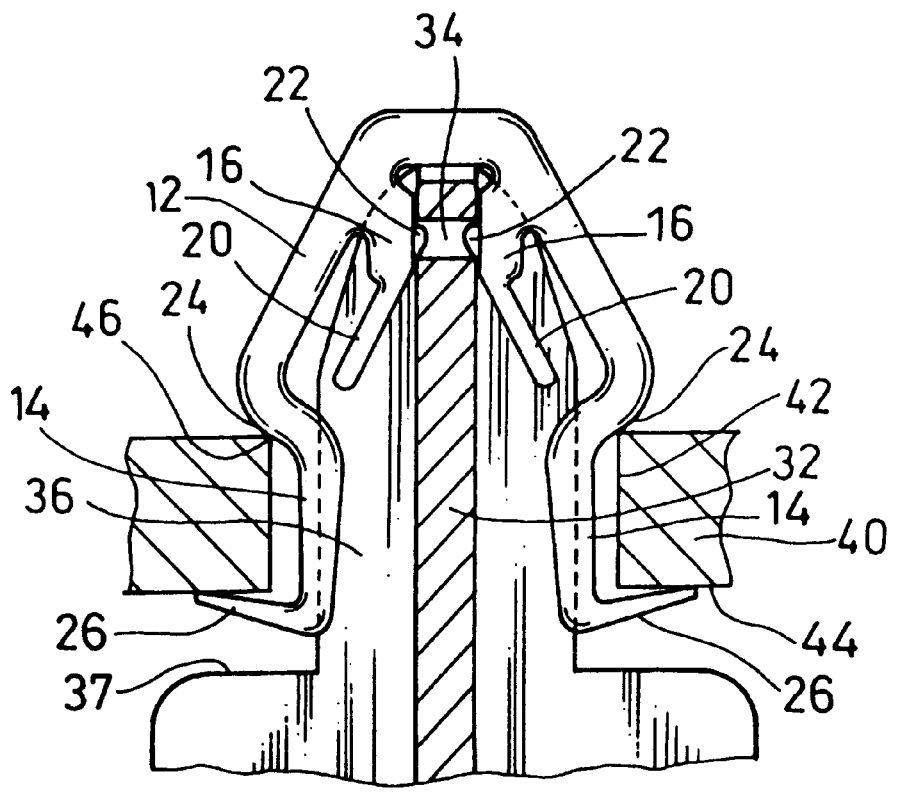
FIG. 4 is an elevational view of the fastener in use.

As shown in FIG. 4, the fastener 10 is pressed to the insertion rib 32 of the cluster 30, with the forward end of the insertion rib 32 positioned between the guide lips 20 of the gripper tongues 16. As a result, the rib 32 is introduced into the space between the gripper surfaces 18 of the gripper tongues 16 while spreading the gripper tongues 16. When the rib 32 is sufficiently inserted into the space, the gripper surfaces 18 squeezingly contact both side surfaces of the rib 32, and simultaneously, the engagement projections 22 formed on the gripper tongues 16 engage the thin slot 34 of the rib 32. Thus, the fastener 10 is firmly fitted onto the insertion rib 32 of the cluster 30.

Thereafter, the insertion rib 32 of the cluster 30 with the fastener 10 is pressed into a mounting aperture 42 formed in the instrument panel 40, so that the fastener 10 fitted to the insertion rib 32 is inserted into the mounting aperture 42 of the instrument panel 40 while inwardly flexing the fastener body 12. At this time, the outer shoulder portions 24 of the fastener body 12 elastically engage an inner edge 46 of the mounting aperture 42, and simultaneously, the stabilizer lips 26 elastically engage an outer surface 44 of the instrument panel 40. As a result, the insertion rib 32 of the cluster 30 is fixed in the mounting aperture 42 of the instrument panel 40 by the fastener 10. Thus, the cluster 30 is removably mounted on the instrument panel 40.

It is to be noted that the fastener 10, when fitted to the insertion rib 32 of the cluster 30, cannot easily incline or loosen since the gripper tongues 16 of the fastener 10 are sufficiently stabilized on the insertion rib 32, because each gripper tongue 16 provides a large area of contact with the insertion rib 32. Therefore, the insertion rib 32 of the cluster 30 with the fastener 10 can be easily pressed into the mounting aperture 42 formed on the instrument panel 40. This may eliminate troublesome work to mount the cluster 30 onto the instrument panel 40. Moreover, the fastener 10 can be effectively prevented from accidentally falling off from the insertion rib 32 during handling of the cluster 30.

Additionally, the stabilizer lips 26 elastically engage the outer surface 44 of the instrument panel 40, thereby stabilizing the fastener 10 in the mounting aperture 42. Therefore, the fastener 10 permits steady mounting of the cluster 30 on the instrument panel 40 if there is a variation in thickness of the instrument panel 40, because the stabilizer lips 26 may compensate for the differences of the thickness to properly engage the outer surface 44 of the instrument panel 40.

To remove the cluster 30 from the instrument panel 40 for maintenance or other purposes, the cluster 30 may be simply pulled. When the cluster 30 is pulled, the fastener body 12 of the fastener 10 is inwardly flexed to disengage the outer shoulder portions 24 of the fastener body 12 from the inner edge 46 of the mounting aperture 42, so that the insertion rib 32 of the cluster 30 is pulled out from the mounting aperture 42. Thus, the cluster 30 is removed from the instrument panel 40.

It should be noted that the cluster 30 can be removed from the instrument panel 40, with the fastener 10 fitted to the insertion rib 32 of the cluster 30, because the fastener 10 is reliably fitted to the insertion rib 32. As a result, the cluster 30 can be remounted on the instrument panel 40 without any additional work.

A second embodiment of the present invention modified from the first embodiment will now be described with reference to FIGS. 6 to 8, wherein constructions and operation identical with or similar to those of the first embodiment will not be explained.

Figure 6:
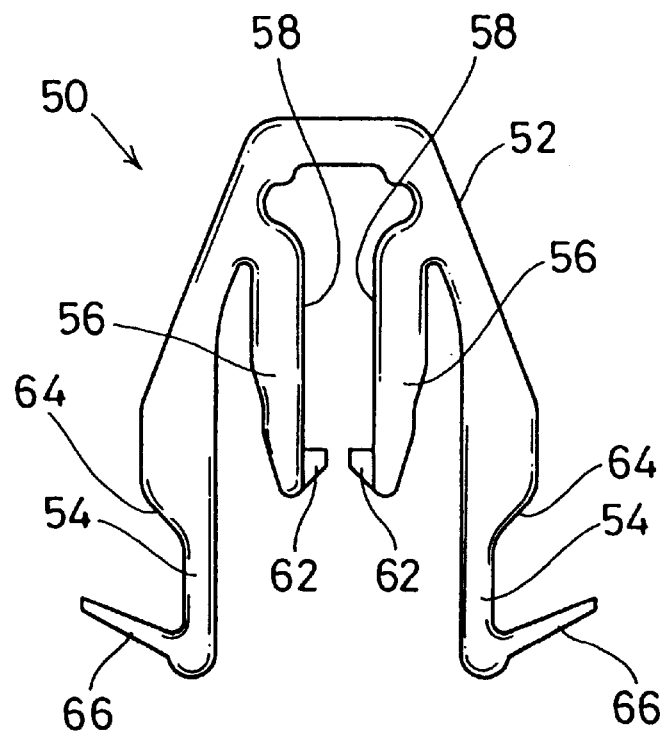
FIG. 6 is an elevational view of a fastener according to a second embodiment of the present invention.
Figure 7:
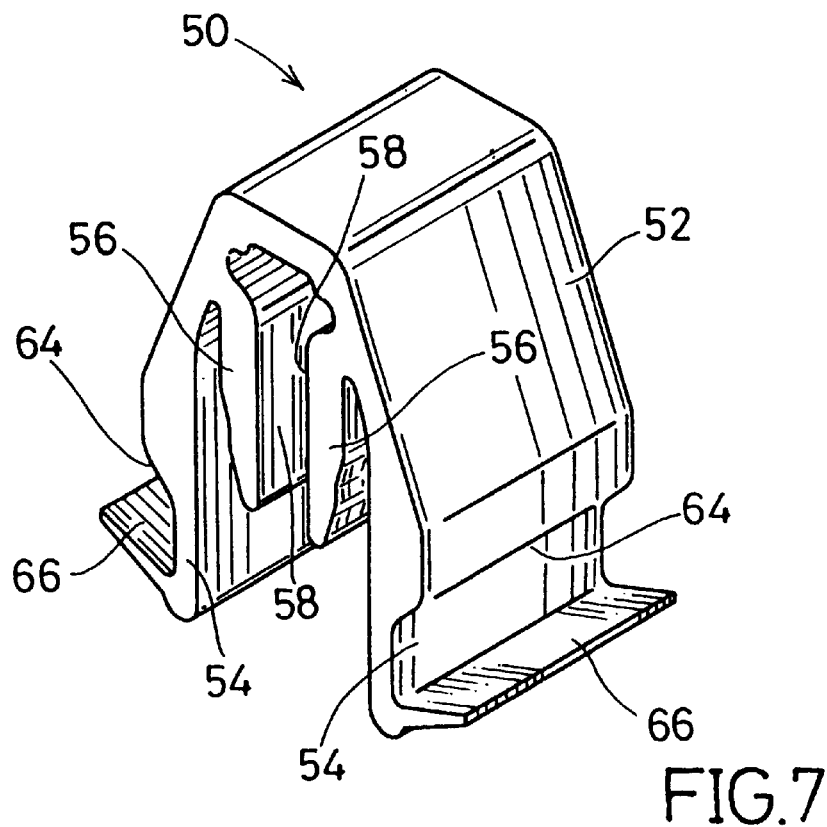
FIG. 7 is a perspective view of the fastener.

As shown in FIGS. 6 and 7, a fastener 50 is mainly constituted of a substantially inverted V-shaped fastener body 52 having end portions, a pair of opposed legs 54 provided on the end portions of the fastener body 52, and a pair of opposed gripper tongues 56 provided on the inner surface of the fastener body 52.

The gripper tongues 56 include a pair of gripper surfaces 58 disposed in substantially parallel opposed relation. As will be apparent from the drawings, each gripper surface 58 has a surface area greater than that of the gripper surface 18 in the first embodiment. Each gripper surface 58 is also provided with an engagement projection 62. The engagement projection 62 is arranged in the distal end of the gripper surface 58 and has an inclined leading surface.

The fastener body 52 has a pair of opposed thickened portions which extend along juncture portions of the fastener body 52 and the legs 54, thereby forming a pair of opposed outer shoulder portions 64 extending therealong. Further, each leg 54 is provided with a stabilizer lip 66 which outwardly projects from the free end thereof.

The operation of the fastener 50 thus constructed will now be described in connection with the process for mounting a cluster (which is the same cluster as in the first embodiment) onto an instrument panel (which is the same instrument panel as in the first embodiment).

Figure 8:
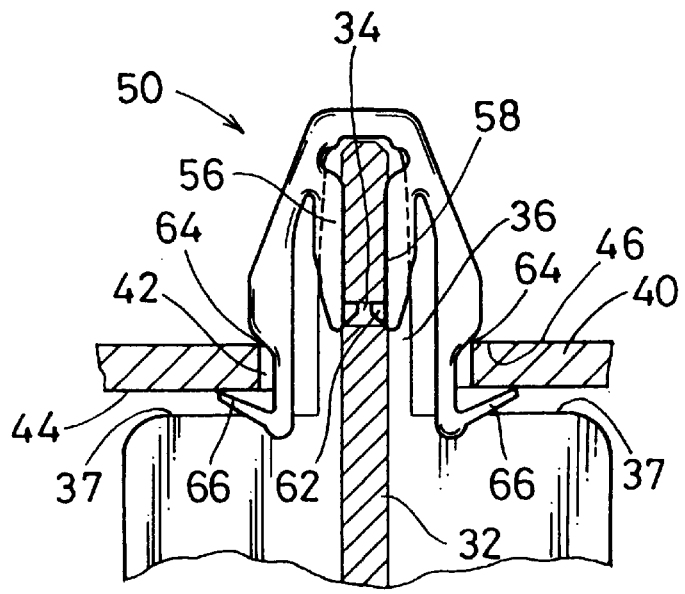
FIG. 8 is an elevational view of the fastener in use.

As shown in FIG. 8, like the fastener 10 in the first embodiment, the fastener 50 is pressed to the insertion rib 32 of the cluster 30. As a result, the rib 32 is introduced into a space between the gripper surfaces 58 of the gripper tongues 56. When the rib 32 is sufficiently inserted into the space, the gripper surfaces 58 squeezingly contact the both side surfaces of the rib 32, and simultaneously, the engagement projections 62 formed on the gripper tongues 56 engage the thin slot 34 of the rib 32. Thus, the fastener 50 is firmly fitted onto the insertion rib 32 of the cluster 30.

Thereafter, the insertion rib 32 of the cluster 30 with the fastener 50 is pressed into the mounting aperture 42 formed on the instrument panel 40, so that the fastener 50 fitted to the insertion rib 32 is inserted into the mounting aperture 42. At this time, the shoulder portions 64 of the fastener body 52 elastically engage the inner edge 46 of the mounting aperture 42, and simultaneously, the stabilizer lips 66 elastically engage the outer surface 44 of the instrument panel 40. As a result, the insertion rib 32 of the cluster 30 is fixed in the mounting aperture 42 of the instrument panel 40 by the fastener 50. Thus, the cluster 30 is removably mounted on the instrument panel 40.

A third embodiment of the present invention modified from the second embodiment will now be described with reference to FIGS. 9 to 11, wherein constructions and operation identical with or similar to those of the second embodiment will not be explained.

Figure 9:
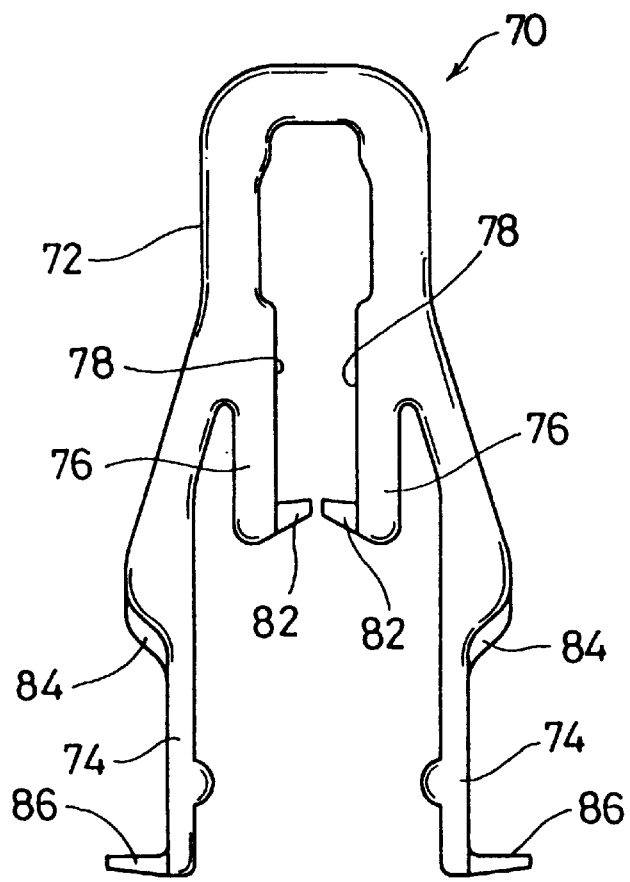
FIG. 9 is an elevational view of a fastener according to a third embodiment of the present invention.
Figure 10:
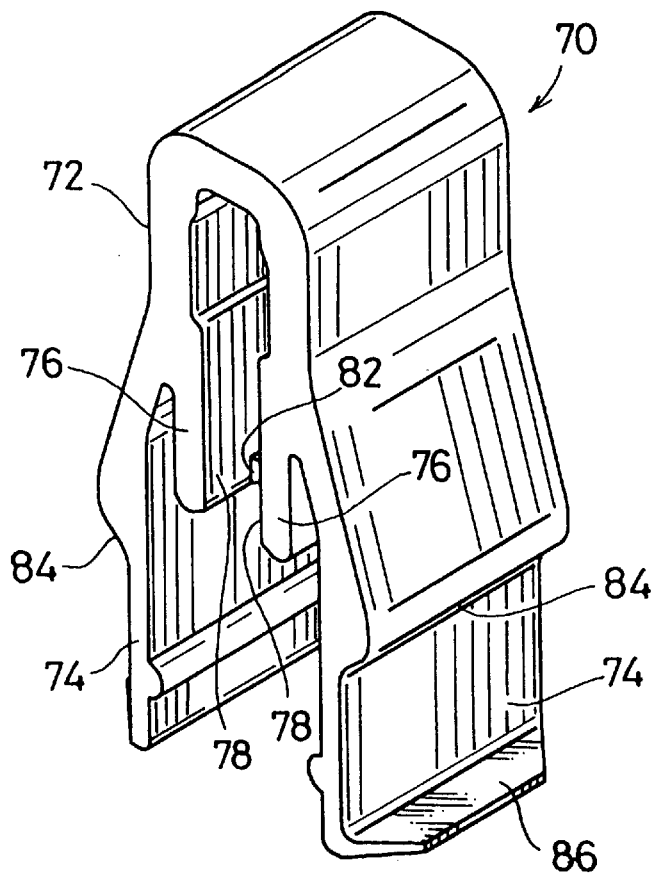
FIG. 10 is a perspective view of the fastener.

As shown in FIGS. 9 and 10, a fastener 70 is mainly constituted of a substantially inverted U-shaped fastener body 72 having end portions, a pair of opposed legs 74 provided on the end portions of the fastener body 72, and a pair of opposed gripper tongues 76 provided on the inner surface of the fastener body 72. As will be apparent from the drawings, the fastener 70 has a length greater than that of the fastener 50 of the second embodiment.

The gripper tongues 76 include a pair of gripper surfaces 78 disposed in substantially parallel opposed relation. Each gripper surface 78 is also provided with an engagement projection 82. The engagement projection 82 is disposed on the distal end of the gripper surface 78 and has an inclined leading surface.

The fastener body 72 has a pair of opposed thickened portions which extend along juncture portions of the fastener body 72 and the legs 74, thereby forming a pair of opposed outer shoulder portions 84 extending therealong. Further, each leg 74 has a stabilizer lip 86 which outwardly projects from the free end thereof.

The operation of the fastener 70 thus constructed will now be described in connection with the process for mounting a cluster (which is the same cluster as in the first embodiment) onto an instrument panel (which is the same instrument panel as in the first embodiment).

Figure 11:
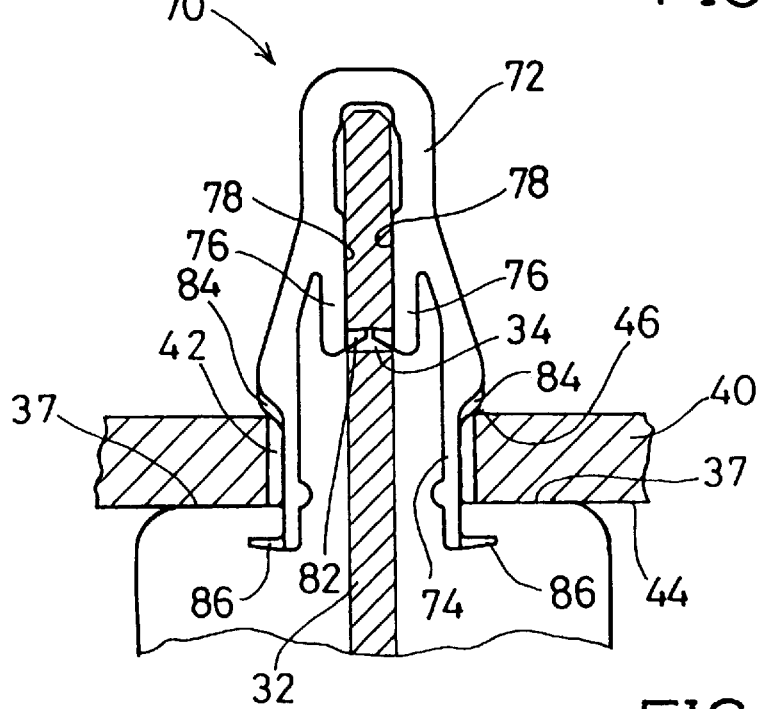
FIG. 11 is an elevational view of the fastener in use.

As shown in FIG. 11, like the fastener 50 in the second embodiment, the fastener 70 is pressed to the insertion rib 32 of the cluster 30. As a result, the rib 32 is introduced into a space between the gripper surfaces 78 of the gripper tongues 76. When the rib 32 is sufficiently inserted into the space, the gripper surfaces 78 squeezingly contact the both side surfaces of the rib 32, and simultaneously, the engagement projections 82 formed on the gripper tongues 76 engage the thin slot 34 of the rib 32. Thus, the fastener 70 is firmly fitted onto the insertion rib 32 of the cluster 30.

Thereafter, the insertion rib 32 of the cluster 30 with the fastener 70 is pressed into the mounting aperture 42 formed on the instrument panel 40 until the seating surfaces 37 of the cluster 30 contact the outer surface 44 of the instrument panel 40. At this time, the fastener 70 is inserted into the mounting aperture 42 with the insertion rib 32, so that the shoulder portions 84 of the fastener body 72 elastically engage the inner edge 46 of the mounting aperture 42. As a result, the insertion rib 32 of the cluster 30 is fixed in the mounting aperture 42 of the instrument panel 40 by the fastener 70, with the seating surface 37 biased towards the outer surface 44 of the instrument panel 40. Thus, the cluster 30 is removably mounted on the instrument panel 40.

As will be apparent from FIG. 11, in this embodiment, the stabilizer lips 86 does not engage the outer surface 44 of the instrument panel 40. Therefore, the stabilizer lips 86 can be eliminated from the legs 74. On the other hand, the stabilizer lips 86 can be dimensionally modified to effectively engage the outer surface 44 of the instrument panel 40, so as to increase stabilizing performance of the cluster 30 on the instrument panel 40.

A fourth embodiment of the present invention modified from the second embodiment will now be described with reference to FIGS. 12 to 14, wherein constructions and operation identical with or similar to those of the second embodiment will not be explained.

Figure 12:
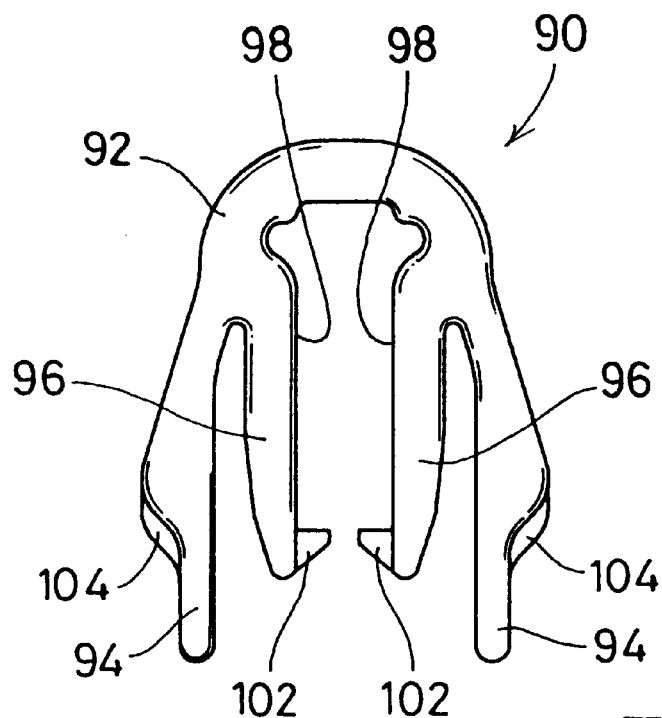
FIG. 12 is an elevational view of a fastener according to a fourth embodiment of the present invention.
Figure 13:
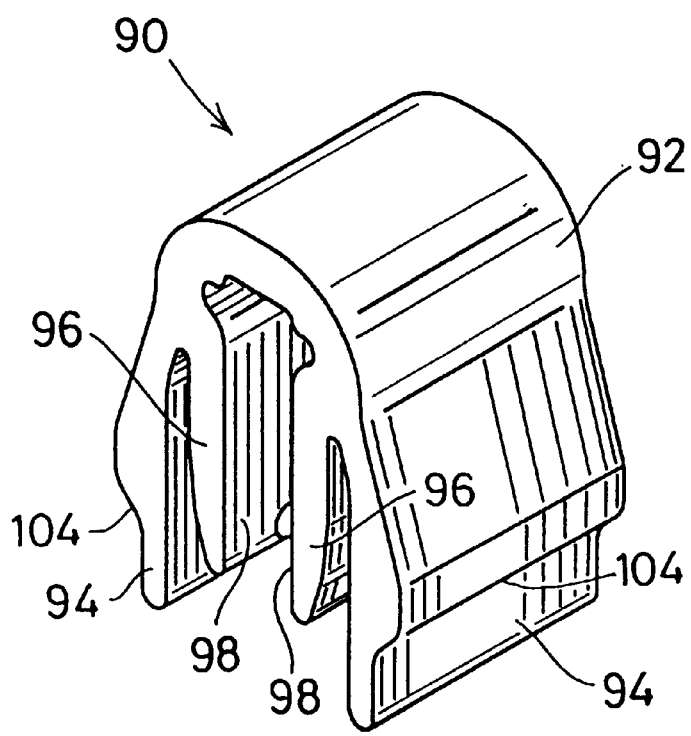
FIG. 13 is a perspective view of the fastener.

As shown in FIGS. 12 and 13, a fastener 90 is mainly constituted of a substantially inverted V-shaped fastener body 92 having end portions, a pair of opposed legs 94 provided on the end portions of the fastener body 92, and a pair of opposed gripper tongues 96 provided on the inner surface of the fastener body 92. As will be apparent from the drawings, the fastener 90 has a rounded outer shape which is somewhat different from the outer shape of the fastener 50 of the second embodiment.

The gripper tongues 96 include a pair of gripper surfaces 98 disposed in substantially parallel opposed relation. Each gripper surface 98 also has an engagement projection 102. The engagement projection 102 is disposed on the distal end of the gripper surface 98 and has an inclined leading surface.

The fastener body 92 has a pair of opposed thickened portions which extend along juncture portions of the fastener body 92 and the legs 94, thereby forming a pair of opposed outer shoulder portions 104 extending therealong.

The operation of the fastener 90 thus constructed will now be described in connection with the process for mounting a cluster (which is the same cluster as in the first embodiment) onto an instrument panel (which is the same instrument panel as in the first embodiment).

Figure 14:
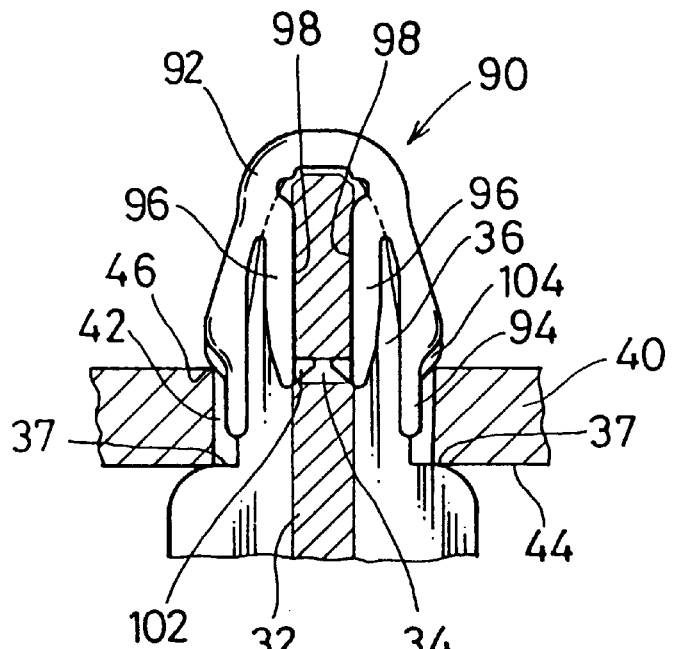
FIG. 14 is an elevational view of the fastener in use.
Figure 15:
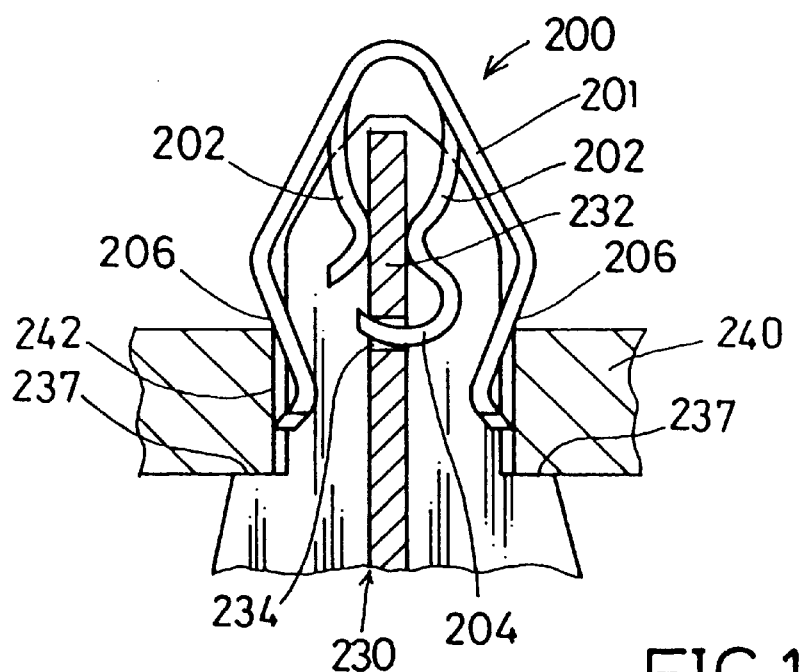
FIG. 15 is an elevational view of a conventional fastener in use.

As shown in FIG. 14, like the fastener 50 in the second embodiment, the fastener 90 is pressed onto the insertion rib 32 of the cluster 30. As a result, the rib 32 is introduced into a space between the gripper surfaces 98 of the gripper tongues 96. When the rib 32 is sufficiently inserted into the space, the gripper surfaces 98 squeezingly contact the both side surfaces of the rib 32, and simultaneously, the engagement projections 102 formed on the gripper tongues 96 engage the thin slot 34 of the rib 32. Thus, the fastener 90 is firmly fitted onto the insertion rib 32 of the cluster 30.

Thereafter, the insertion rib 32 of the cluster 30 with the fastener 90 is pressed into the mounting aperture 42 formed in the instrument panel 40 until the seating surfaces 37 of the cluster 30 contact the outer surface 44 of the Instrument panel 40. At this time, the fastener 90 is inserted into the mounting aperture 42 with the insertion rib 32, so that the shoulder portions 104 of the fastener body 90 elastically engage the inner edge 46 of the mounting aperture 42. As a result, the insertion rib 32 of the cluster 30 is fixed in the mounting aperture 42 of the instrument panel 40 by the fastener 90, with the seating surface 37 biased towards the outer surface 44 of the instrument panel 40. Thus, the cluster 30 is removably mounted on the instrument panel 40.

As will be apparent from the drawings, in this embodiment, no stabilizer lip is provided on the engagement lips 94. However, the engagement lips 94 can be provided with stabilizer lips to engage the outer surface 44 of the instrument panel 40, so as to increase stabilizing performance of the cluster 30 on the instrument panel 40.

Although in the above preferred embodiments, the fastener is used to mount the cluster onto the instrument panel, such a fastener may be used for many applications, for example, to mount a garnish, a molding and like members onto an automobile body. Additionally, the fastener may have various configurations, depending on the purposes.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. An integrally molded fastener, comprising:
  a body having an elastic shoulder portion and an interior surface; and
  a pair of gripper tongues disposed on the interior surface of the body, the gripper tongues each having a flat surface and engagement projections extending inwardly from a center portion of each said flat surface, wherein the pair of engagement projections is constructed and arranged to engage an aperture in an insertion rib, the pair of flat surfaces being in a parallel opposed relation and being constructed and arranged to facially contact and squeeze both side surfaces of the insertion rib when the fastener is fitted onto the insertion rib,
  the fastener thereby being firmly and stably fitted onto the insertion rib.

2. A fastener as in claim 1, wherein the body has a shape selected from the group consisting of a V-shape, a U-shape and a rounded shape.

3. A fastener as in claim 1, wherein the body, gripper tongues, and engagement projections are formed of integrally molded resin.

4. A fastener as in claim 1, further comprising at least one elastic stabilizer disposed on one end of the body.

5. In combination,
  the fastener of claim 4;
  a cluster comprising an insertion rib having an aperture and a pair of plate-like projections supporting the insertion rib, each plate-like projection having a pair of shouldered seating surfaces, wherein the pair of fastener engagement projections engage the insertion rib aperture and the fastener gripper tongue flat surfaces facially contact and squeeze the insertion rib; and
  a panel having an inner surface, an outer surface and an aperture, wherein the fastener body is inserted in the panel aperture, the fastener body shoulder contacts the panel inner surface and the stabilizer contacts the panel outer surface.

6. A fastener as in claim 1, wherein the body has two shoulder portions, wherein a leg extends from each shoulder portion and an elastic stabilizer is disposed on each leg.

7. In combination,
  the fastener of claim 6;
  a cluster comprising an insertion rib having an aperture and a pair of plate-like projections supporting the insertion rib, each plate-like projection having a pair of shouldered seating surfaces, wherein the fastener engagement projections engage the insertion rib aperture and the fastener gripper tongue flat surfaces facially contact and squeeze the insertion rib; and
  a panel having an inner surface, an outer surface and an aperture, wherein the fastener body is inserted in the panel aperture, the fastener body shoulder contacts the panel inner surface and the stabilizers contact the panel outer surface.

8. A fastener as in claim 1, further comprising a guide portion disposed on each gripper tongue, the pair of guide portions disposed in a substantially V-shaped configuration.

9. In combination,
  the fastener of claim 8;
  a cluster comprising an insertion rib having an aperture and a pair of plate-like projections supporting the insertion rib, each plate-like projection having a pair of shouldered sealing surfaces, wherein the fastener engagement projections engage the insertion rib aperture and the fastener gripper tongue flat surfaces facially contact and squeeze the insertion rib; and
  a panel having an inner surface, an outer surface and an aperture, wherein the fastener body is inserted in the panel aperture and the fastener body shoulder contacts the panel inner surface.

10. A fastener as in claim 8, wherein the guide portions comprise guide lips.

11. A fastener as in claim 1, wherein the engagement projections have inclined leading faces.

12. In combination,
the fastener of claim 11;
a cluster comprising an insertion rib having an aperture and a pair of plate-like projections supporting the insertion rib, each plate-like projection having a pair of shouldered seating surfaces, wherein the fastener engagement projections engage the insertion rib aperture and the fastener gripper tongue flat surfaces facially contact and squeeze the insertion rib; and
a panel having an inner surface, an outer surface and an aperture, wherein the fastener body is inserted in the panel aperture and the fastener body shoulder contacts the panel inner surface.

13. In combination,
the fastener of claim 1;
a cluster comprising an insertion rib having an aperture and a pair of plate-like projections supporting the insertion rib, each plate-like projection having a pair of shouldered seating surfaces, wherein the fastener engagement projections engage the insertion rib aperture and the fastener gripper tongue flat surfaces facially contact and squeeze the insertion rib; and
a panel having an inner surface, an outer surface and an aperture, wherein the fastener body is inserted in the panel aperture and the fastener body shoulder contacts the panel inner surface.

14. A combination as in claim 13, wherein the cluster shouldered seating surfaces contact the panel outer surface.

15. A fastener as in claim 1, further comprising:
two elastic stabilizers, and
a guide portion disposed on each gripper tongue, the pair of guide portions disposed in a substantially V-shaped configuration, each of the guide portions comprising a guide lip,
wherein the body has a V-shape and has two shoulder portions with a leg extending from each shoulder portion, wherein one elastic stabilizer is disposed on each leg, wherein the engagement projections have inclined leading faces and wherein the body, gripper tongues and engagement projections are integrally molded resin.

16. In combination,
the fastener of claim 15;
a cluster comprising the insertion rib and a pair of plate-like projections supporting the insertion rib, each plate-like projection having pair of shouldered seating surfaces, wherein the pair of fastener engagement projections engage the insertion rib aperture and the fastener gripper tongue flat surfaces facially contact and squeeze the insertion rib; and
a panel having an inner surface, an outer surface and an aperture, wherein the fastener body is inserted in the panel aperture, the fastener body shoulder contacts the panel inner surface and the stabilizers contact the panel outer surface.

17. An integrally molded fastener for use in reversibly mounting a mounting object on a panel, wherein the fastener is fitted onto an insertion rib of the mounting object and the fastener is inserted into a mounting aperture of the panel, comprising:
a fastener body having an interior portion and a shoulder portion, the shoulder portion capable of elastically engaging an inner edge of the mounting aperture when the fastener is inserted into the mounting aperture of the panel;
a gripper portion disposed on the interior portion of the fastener body comprising a pair of opposed gripper tongues integrally formed on the inner portion of the fastener body,
a pair of flat surfaces formed on the pair of opposed gripper tongues in a parallel opposed relation, the pair of flat surfaces contacting opposite surfaces of the insertion rib when the fastener is fitted onto the insertion rib; and
a pair of engagement projections disposed respectively on center portions the flat surfaces that are capable of engaging a slot formed in the insertion rib,
the fastener thereby being firmly and stably fitted onto the insertion rib.

18. A fastener as in claim 17, further comprising a stabilizer disposed on the fastener body, the stabilizer capable of elastically engaging an outer surface of the panel when the fastener is inserted into the panel.

19. A fastener as in claim 17, wherein the fastener body is formed such that the shoulder portion engages the inner edge of the mounting aperture of the panel when the insertion rib is pressed into the mounting aperture until a seating surface on the mounting object contacts an outer surface of the panel.

20. A fastener as in claim 17, wherein a guide portion is disposed on each of the gripper portions, whereby the guide portion can guide the insertion rib.

21. A fastener as in claim 20, wherein the guide portion comprises a guide lip.

22. A fastener as in claims 17, wherein the fastener body has a substantially V-shaped configuration.

23. A fastener as in claim 17, wherein the fastener body and the gripper portion are integrally formed from a resin.

24. A fastener as in claim 17, wherein the at least one engagement projection comprises an engagement surface capable of engaging an inner surface of the slot.

25. A fastener as in claim 17, wherein the at least one engagement projection comprises an inclined leading surface, whereby the inclined leading surface can guide the insertion rib.

26. A fastener as in claim 17, further comprising a stabilizer disposed on the fastener body, the stabilizer capable of elastically engaging an outer surface of the panel when the fastener is inserted into the panel and wherein the pair of engagement projections comprise:
engagement surfaces capable of engaging an inner surface of the slot, and
inclined leading surfaces, whereby the inclined leading surfaces can guide the insertion rib,
wherein the fastener body is formed such that the shoulder portion engages the inner edge of the mounting aperture of the panel when the insertion rib is pressed into the mounting aperture until a seating surface on the mounting object contacts an outer surface of the panel, wherein a guide portion is disposed on each of the gripper portions, whereby the guide portion can guide the insertion rib, wherein the guide portion comprises a guide lip, wherein the fastener body has a substantially V-shaped configuration and wherein the fastener body and the gripper portion are integrally formed from a resin.

* * * * *